(12) United States Patent
Knoblett et al.

(10) Patent No.: US 9,315,219 B2
(45) Date of Patent: Apr. 19, 2016

(54) TRACTOR

(71) Applicant: YANMAR CO., LTD., Osaka-shi, Osaka (JP)

(72) Inventors: Michael Knoblett, Adairsville, GA (US); Tetsuya Iida, Osaka (JP); Yutaka Matsui, Osaka (JP); Takashi Goto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/318,102

(22) Filed: Jun. 27, 2014

(65) Prior Publication Data

US 2015/0108789 A1 Apr. 23, 2015

Related U.S. Application Data

(60) Provisional application No. 61/892,578, filed on Oct. 18, 2013.

(51) Int. Cl.
*B62D 33/06* (2006.01)
*B60R 21/13* (2006.01)

(52) U.S. Cl.
CPC .......... *B62D 33/0617* (2013.01); *B60R 21/131* (2013.01); *B62D 33/06* (2013.01)

(58) Field of Classification Search
CPC .... B60R 21/13; B60R 21/131; B60R 21/132; B62D 33/06; B62D 33/0613
USPC .............................. 296/190.03, 102; 280/756
See application file for complete search history.

(56) References Cited

U.S. PATENT DOCUMENTS

| | | | | |
|---|---|---|---|---|
| 3,632,134 | A * | 1/1972 | Babbitt et al. | 280/756 |
| 4,184,712 | A * | 1/1980 | Skahill | 296/190.03 |
| 4,600,236 | A * | 7/1986 | Weiss et al. | 296/190.03 |
| 4,669,565 | A * | 6/1987 | Miki et al. | 180/89.12 |
| 6,149,228 | A * | 11/2000 | O'Neill et al. | 296/190.03 |
| 6,419,304 | B1 * | 7/2002 | Richardson, II | B60R 21/13 280/756 |
| 7,429,075 | B2 * | 9/2008 | Turnbull et al. | 296/190.11 |
| 7,467,820 | B2 * | 12/2008 | Gotz | 296/190.03 |
| 7,845,711 | B2 * | 12/2010 | Orrell et al. | 296/190.03 |
| 8,579,364 | B2 * | 11/2013 | Fukudome et al. | 296/190.08 |
| 2001/0050495 | A1 * | 12/2001 | Sorensen et al. | 296/102 |
| 2006/0186703 | A1 * | 8/2006 | Yamamoto | 296/190.03 |

(Continued)

FOREIGN PATENT DOCUMENTS

| | | | |
|---|---|---|---|
| EP | 1 008 493 A2 | 6/2000 | |
| FR | 1 564 979 A | 4/1969 | |

(Continued)

OTHER PUBLICATIONS

European Search Report for European Application No. 14188312.4, mailed Feb. 20, 2015, 5 pages.

*Primary Examiner* — Gregory Blankenship
(74) *Attorney, Agent, or Firm* — Sterne, Kessler, Goldstein & Fox P.L.L.C.

(57) ABSTRACT

A tractor comprises a seat, a safety frame, a vehicle body frame, right and left attachment brackets, a front frame and a roof frame. The safety frame has two struts standing from right and left side portions rearward from the seat. The right and left attachment brackets are fixed on both right and left outer surfaces of the vehicle body frame. The front frame is formed in a gate shape in front view so as to have right and left lower portions detachably attached to the right and left attachment brackets. The roof frame is detachably attached so as to connect a right or left upper portion of the front frame to a right or left upper portion of the safety frame.

4 Claims, 10 Drawing Sheets

(56) References Cited

U.S. PATENT DOCUMENTS

2006/0249986 A1* 11/2006 Yoon .................. 296/190.03
2008/0007090 A1* 1/2008 Ayabe ................. 296/190.03

FOREIGN PATENT DOCUMENTS

| GB | 1 182 282 A | 2/1970 |
| JP | 11-115661 | 4/1999 |

* cited by examiner

TRACTOR

CROSS-REFERENCE TO RELATED APPLICATIONS

This application claims the benefit of U.S. Provisional Application No. 61/892,578, filed on Oct. 18, 2013, which is incorporated by reference in its entirety.

BACKGROUND OF THE INVENTION

1. Field of the Invention

The present invention relates to a tractor equipped with a two-strut type safety frame that has two struts.

2. Related Art

As disclosed by JP H11-115661 A, a well-known conventional tractor is equipped with a reverse U-shaped two-strut safety frame that has two struts erected from right and left side portions rearward from an operator's seat. Right and left frames may be optionally mounted on the tractor so as to extend from a portion forward from the seat to an upper portion of the safety frame. The right and left frames mounted on the tractor are rotatable laterally distally.

The right and left frames are advantageous to protect an operator sitting on the seat from branches of trees during traveling of the tractor in an orchard. Even if the tractor turns over and lies on its side, an operator can rotate the right or left frame laterally distally so as to ensure a way for escape of the operator from the tractor. However, the right and left frames are not adaptable so as to be provided thereon with any additional members, e.g., a roof or a door, for constituting a cabin or a canopy for weatherproofing or sun-shading an operator sitting on the seat.

SUMMARY OF THE INVENTION

An object of the invention is to provide a tractor equipped with a two-strut safety frame, which is improved so as to be able to be used for optionally mounting a cabin or canopy having four struts on the tractor.

To achieve the object, a tractor comprises a seat, a safety frame, a vehicle body frame, right and left attachment brackets, a front frame and a roof frame. The safety frame has two struts standing from right and left side portions rearward from the seat. The right and left attachment brackets are fixed on both right and left outer surfaces of the vehicle body frame. The front frame is formed in a gate shape in front view so as to have right and left lower portions detachably attached to the right and left attachment brackets. The roof frame is detachably attached so as to connect a right or left upper portion of the front frame to a right or left upper portion of the safety frame.

Therefore, the front frame and the roof frame can be optionally attached to the two-strut type safety frame so that the two-strut type safety frame and the front frame and the roof frame attached to the safety frame serve as a safety frame having four struts (hereinafter referred to as four-strut type safety frame), which is adaptable as a fundamental framework of a canopy or a cabin.

Preferably, the tractor further comprises a roof attachment member and a roof. The roof attachment member is provided on an outer side of the roof frame. The roof is attached to the roof attachment member.

Therefore, the four-strut type safety frame having the roof mounted on the roof frame via the roof attachment member serves as a canopy for sun-shading and rain-proofing an operator sitting on the seat, and can serve as a cabin for sun-shading and weatherproofing the operator if only it is further provided with additional members for constituting a cabin, e.g., a door and a window glass.

Preferably, the tractor further comprises a hinge attachment portion and a door. The hinge attachment portion is provided on an outer surface of the right or left upper portion of the safety frame. The door is attached to the hinge attachment portion via a hinge so as to cover a side surface defined by the safety frame, the front frame and the roof frame.

Therefore, the four-strut type safety frame having the door attached to the hinge attachment portion can serve as a cabin if only it is further provided with other members for constituting a cabin, e.g., a roof and a window glass.

These, further and other objects, features and advantages of the invention will appear more fully from the following detailed description of the invention with reference to the attached drawings.

DETAILED DESCRIPTION OF THE INVENTION

A tractor of the present invention is applicable to a working vehicle such as agricultural machinery and construction machinery including a safety frame that protects an operation portion.

Figure 1:
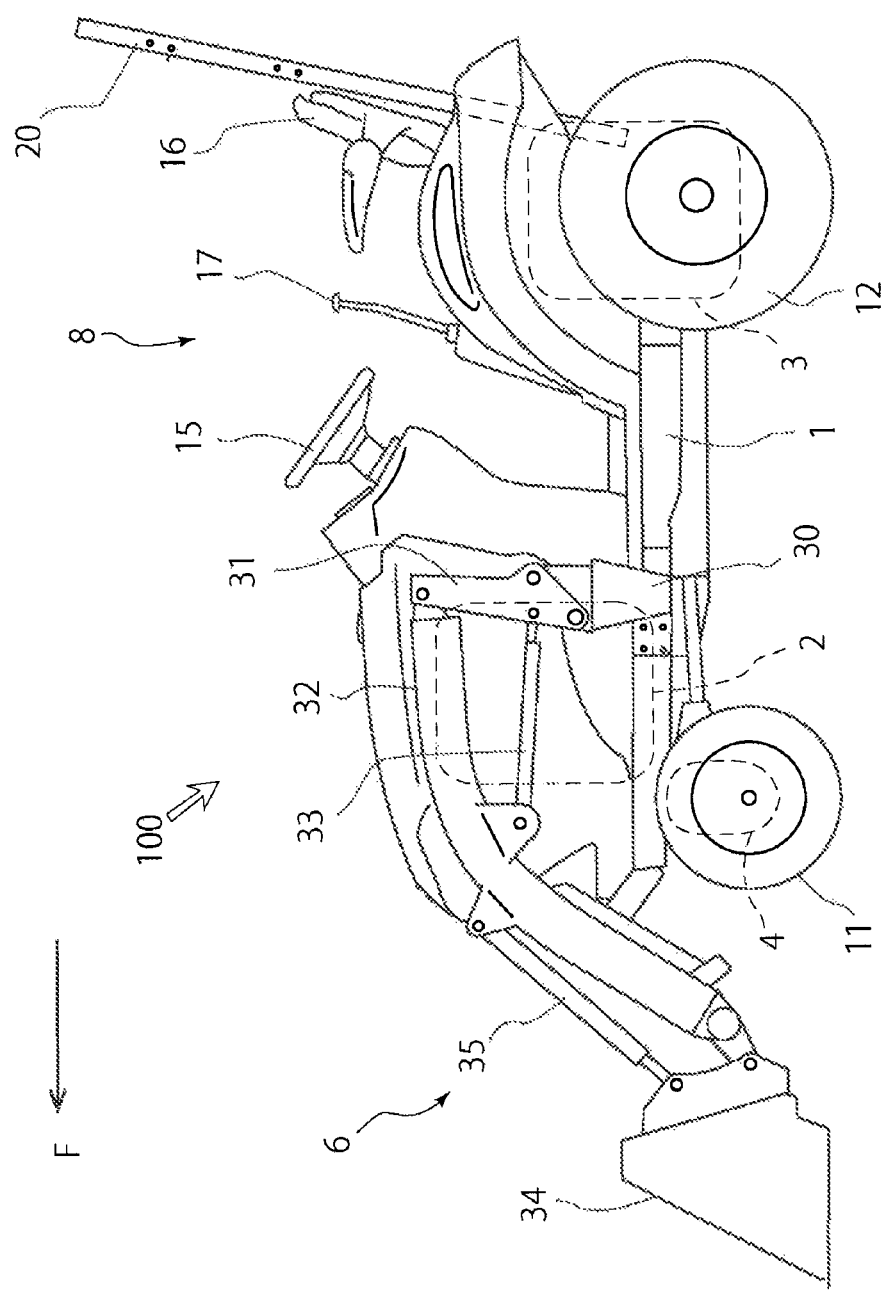
FIG. 1 is a side view of a tractor including a two-strut type safety frame.

First, an overall structure of a tractor 100 is described. FIG. 1 shows the overall structure of the tractor 100. In the figure, F indicates the front direction of the tractor 100.

The tractor 100 mainly includes a vehicle body frame 1, an engine 2, a mission casing 3, a front axle casing 4, and a rear axle casing 5. The tractor 100 includes a front loader 6 on the front portion.

Figure 5:
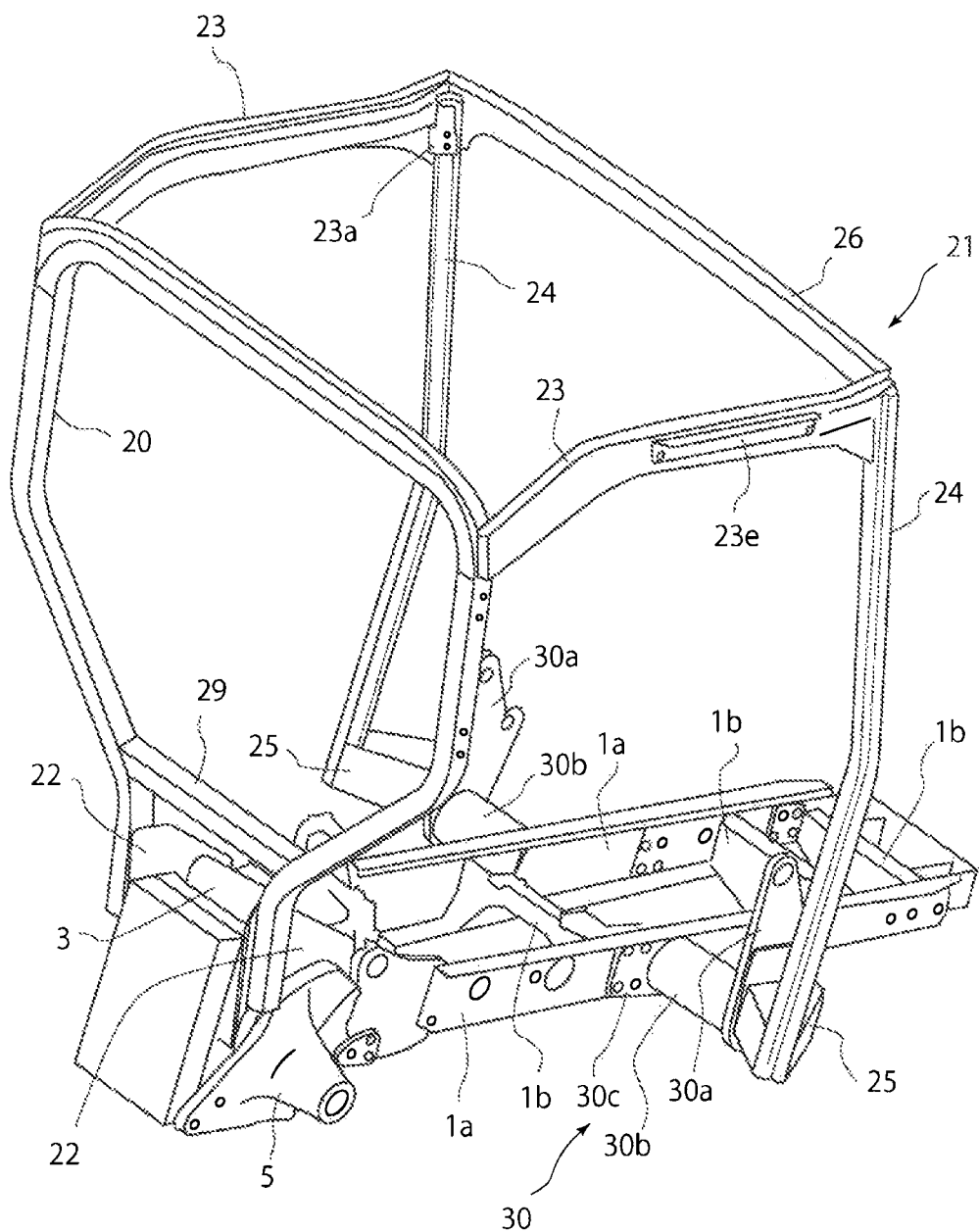
FIG. 5 is a rear perspective view of the same.

The vehicle body frame 1 serves as the main structure for the tractor 100. The frame structure is not limited, and an engine frame, a clutch housing, and a mission casing may integrally form the vehicle body frame. As shown in FIG. 5, the vehicle body frame 1 has a shape of a rectangular frame with a pair of left and right longitudinal frames 1a and 1a and lateral frames 1b, 1b, and 1b laid between the left and the right longitudinal frames 1a and 1a.

The engine 2 is placed and fixed on a front upper portion of the vehicle body frame 1. The front axle casing 4 is attached to a front lower portion of the vehicle body frame 1. The mission casing 3 is attached to a rear portion of the vehicle body frame 1. An operation portion 8 is disposed on the center portion of the vehicle body frame 1 in the front and rear direction.

The engine 2 converts energy obtained by burning a fuel into rotational movement. When an operator operates an acceleration pedal (or an acceleration lever) disposed in the operation portion 8, the engine 2 changes the driving state in accordance with the operation. The engine 2 maintains the rotational speed at a constant level even when the load changes.

The mission casing 3 accommodates a transmission for switching between forward and backward movement of the tractor 100 and shifting the speed of the tractor 100. When the operator operates a shift lever, the operation state of the transmission changes in accordance with the operation. The transmission includes a hydromechanical continuously variable transmission (HMT or I-HMT) as a transmission device. A base portion of a safety frame 20 described later is attached to a rear portion of the mission casing 3. Alternatively, the safety frame 20 can be attached to the rear axle casing 5. A PTO output mechanism is provided to the rear portion of the mission casing 3. The rotational energy can be transmitted to an implement through the PTO output mechanism.

The front axle casing 4 accommodates an input shaft, a front differential device, and the like that transmit the rotational energy from the engine 2 to front wheels 11. The rotational energy from the engine 2 is input to the front axle casing 4 through the transmission. The front axle casing 4 is disposed next to a steering device. When the operator operates a handle 15, the steering device changes a steering angle of the front wheels 11 in accordance with the operation. The rear axle casing 5 includes a reducing gear, a rear axle, and the like, and transmits the rotational energy from the engine 2 to rear wheels 12.

The operation portion 8 includes the handle 15, the seat 16, an acceleration lever, a gear lever, an operation lever, a loader lever 17, and the like.

The front loader 6 includes loader struts 31, a loader arm 32, an arm cylinder 33, a bucket 34, and a bucket cylinder 35. The bucket 34 disposed on the front side of the tractor 100 can be rotated upward and downward by the arm cylinder 33 and the bucket cylinder 35. Thus, the bucket 34 can scoop, move, and place soil and the like.

The pair of left and right loader struts 31 stand from attachment brackets 30 fixed on side surfaces at an intermediate portion, of the vehicle body frame 1, in the front and rear direction. The attachment brackets 30 are disposed on front left and right outer sides of the step of the operation portion 8. The loader struts 31 are disposed on the sides of the rear portion of a hood covering the engine 2. The loader struts 31 are attached to upper portions of the attachment brackets 30 in a removable manner. A base portion of the loader arm 32 is supported on the upper portions of the loader struts 31 in a rotatable manner. A base portion of the arm cylinder 33 is supported on an intermediate portion of the loader strut 31 in the upper and lower direction, in a rotatable manner.

The loader arm 32 has a dogleg shape in side view. The base portion of the loader arm 32 is pivotally supported on the upper portion of the loader strut 31. The arm cylinder 33 is interposed between an intermediate portion of the loader arm 32 and the loader strut 31. The loader arm 32 can be moved upward and downward by extending and contracting the arm cylinder 33.

A rear lower portion of the bucket 34 is pivotally supported on a distal end of the loader arm 32. The bucket cylinder 35 is interposed between the rear upper portion of the bucket 34 and an intermediate portion of the loader arm 32 in the front and rear direction. The bucket 34 can be rotated by extending and contracting the bucket cylinder 35.

Attachment brackets 30 each include an attachment plate 30a, a supporting pipe 30b, and a base plate 30c, as shown in FIG. 5. The attachment bracket 30 protrudes outward from an intermediate portion of the side plate of the vehicle body frame 1, in the front and rear direction. Screw holes are formed in the base plate 30c. The screw holes are used to fix the base plates 30c to the vehicle body frame 1 with bolts. The supporting pipes 30b with the axial center in the left and right direction are welded and fixed on to the side surfaces of the base plates 30c. A lower inner side surface of the attachment plate 30a is welded and fixed on the outer side of the supporting pipe 30b. The lower outer side surface of the attachment plate 30a is provided with screw holes for fixing a strut bracket 25 disposed on the lower end of a front strut 24 described later by bolts. The attachment plate 30a includes an engagement recess and a bolt fixing portion, at an upper portion. A lower portion of the loader strut 31 is engaged with the engagement recess and the bolt fixing portion, so that the loader strut 31 is easily attached and detached.

A gate shaped front frame 21 and roof frames 23 and 23 are able to be attached and detached between the attachment bracket 30 and the safety frame 20. The front frame 21 includes the front struts 24 and 24 standing from the left and the right attachment brackets 30 and an upper frame 26 coupling between the front struts 24 and 24.

Figure 4:
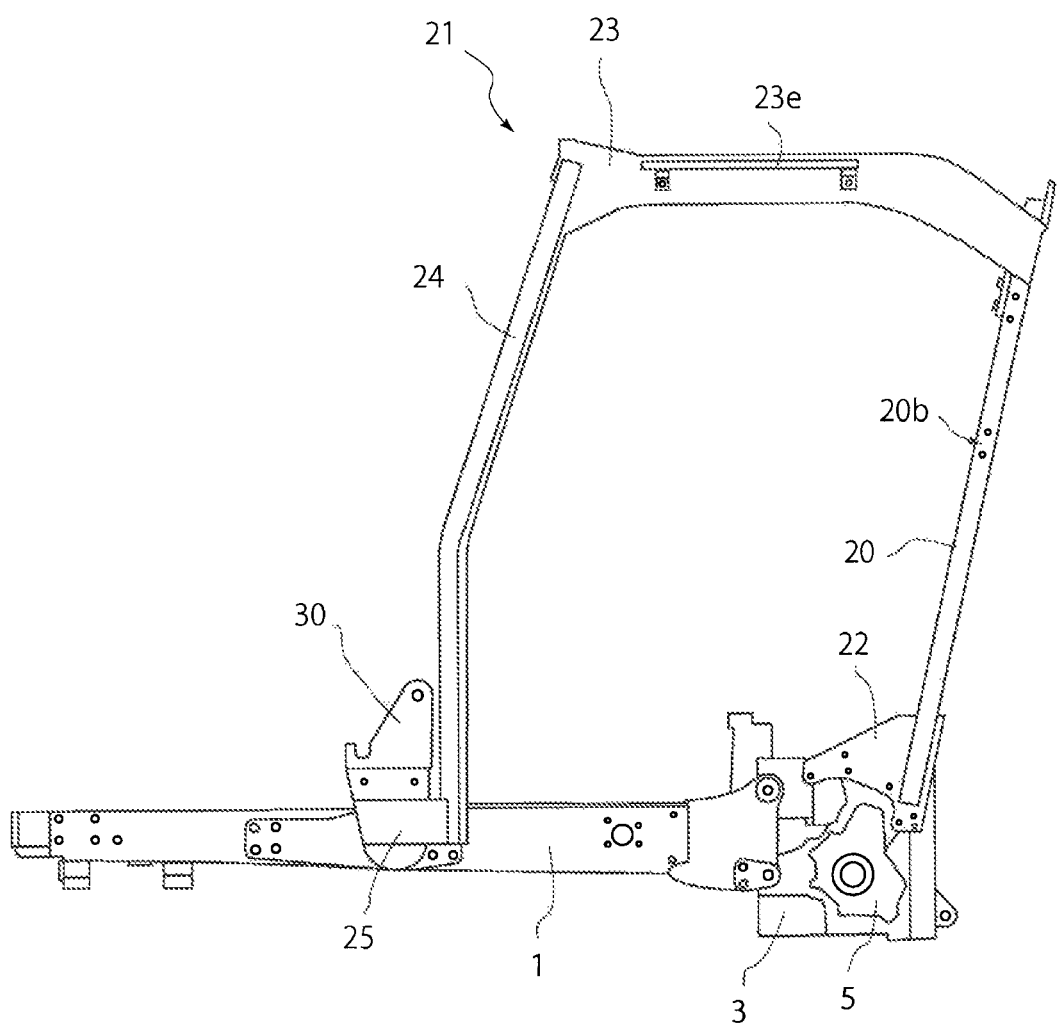
FIG. 4 is a side view of a structure where the safety frame and a front strut are attached to a vehicle body frame.
Figure 7:
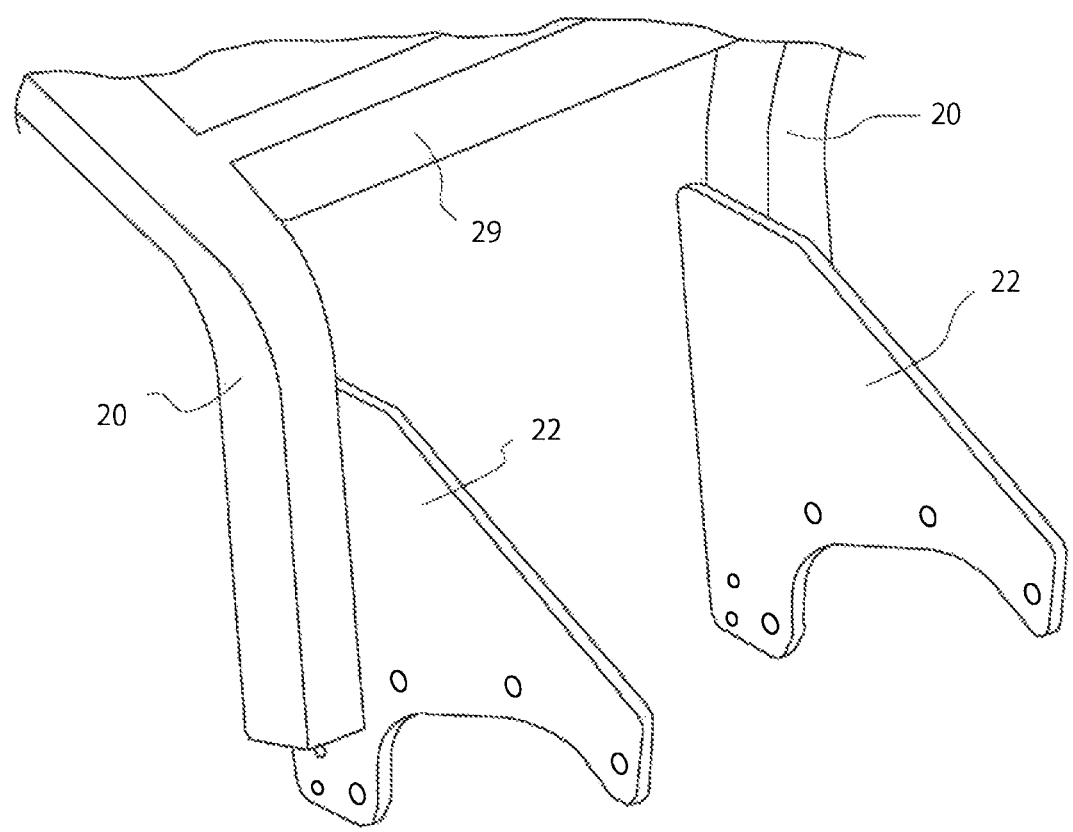
FIG. 7 is a perspective view showing a lower attachment portion of the safety frame.

The safety frame 20 is formed by bending a square pipe into a reversed U shape in rear view. A reinforcement frame 29 is laterally disposed to horizontally extend in the left and right direction at a lower portion of the safety frame 20. Lower ends of the safety frame 20 are attached and fixed on to side surfaces of the mission casing 3 via attachment plates 22 and 22. As shown in FIG. 7, the attachment plate 22 is formed to have an approximately triangular shape in side view. A rear portion of the attachment plate 22 is fixed on the lower inner surface of the safety frame 20. As shown in FIG. 4, a lower portion of the attachment plate 22 is fixed by bolts on the corresponding one of the left and the right side surfaces of the mission casing 3.

Figure 8:
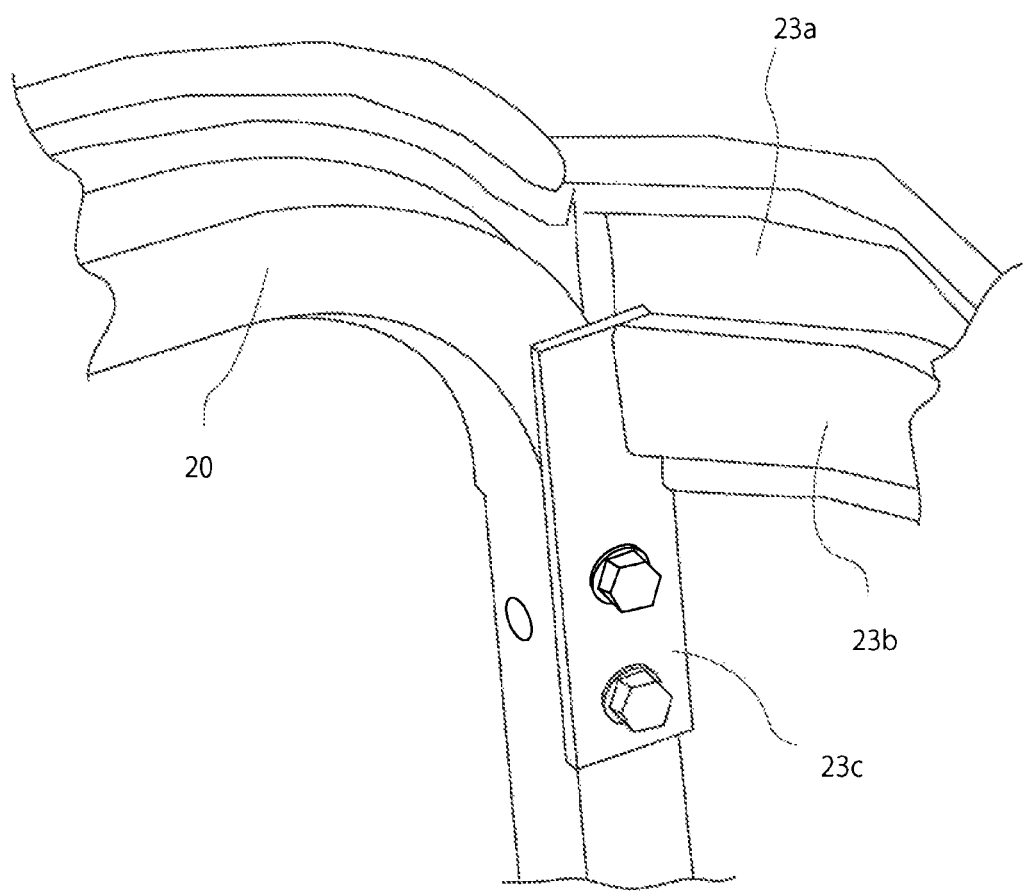
FIG. 8 is a perspective view showing an attachment portion between an upper portion of the safety frame and a rear portion of the roof frame.

Left and right front surfaces of an upper portion of the safety frame 20 are provided with screw holes. Thus, as shown in FIG. 8, a rear portion of the roof frame 23 is able to be fixed to the front surfaces with bolts. As shown in FIG. 4, a hinge attachment portion 20b is disposed on an upper side surface of the safety frame 20. In this embodiment, screw holes 20a are formed in the hinge attachment portion 20b, and thus, a hinge 42 (FIG. 3) is attached to the hinge attachment portion 20b, and a door 41 is attached to the hinge 42.

Figure 9:
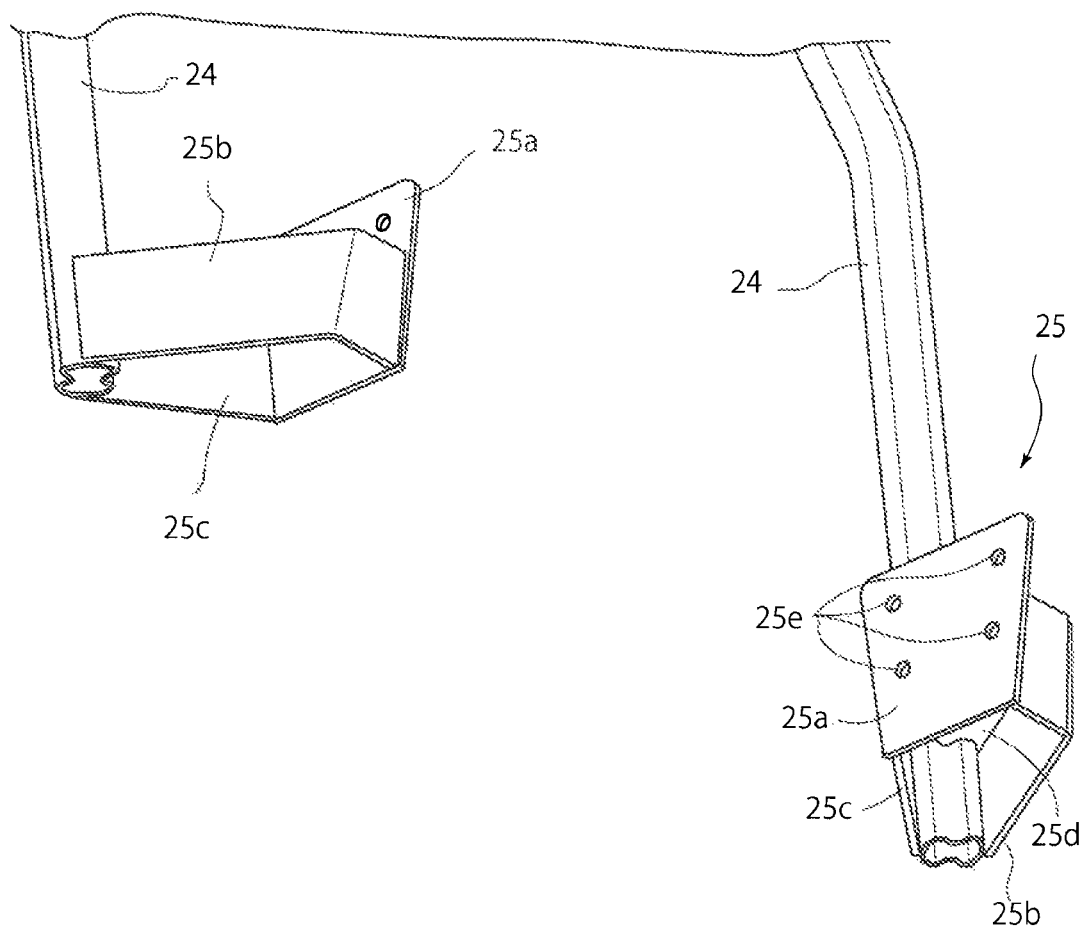
FIG. 9 is a perspective view showing an attachment portion of the front strut.
Figure 10:
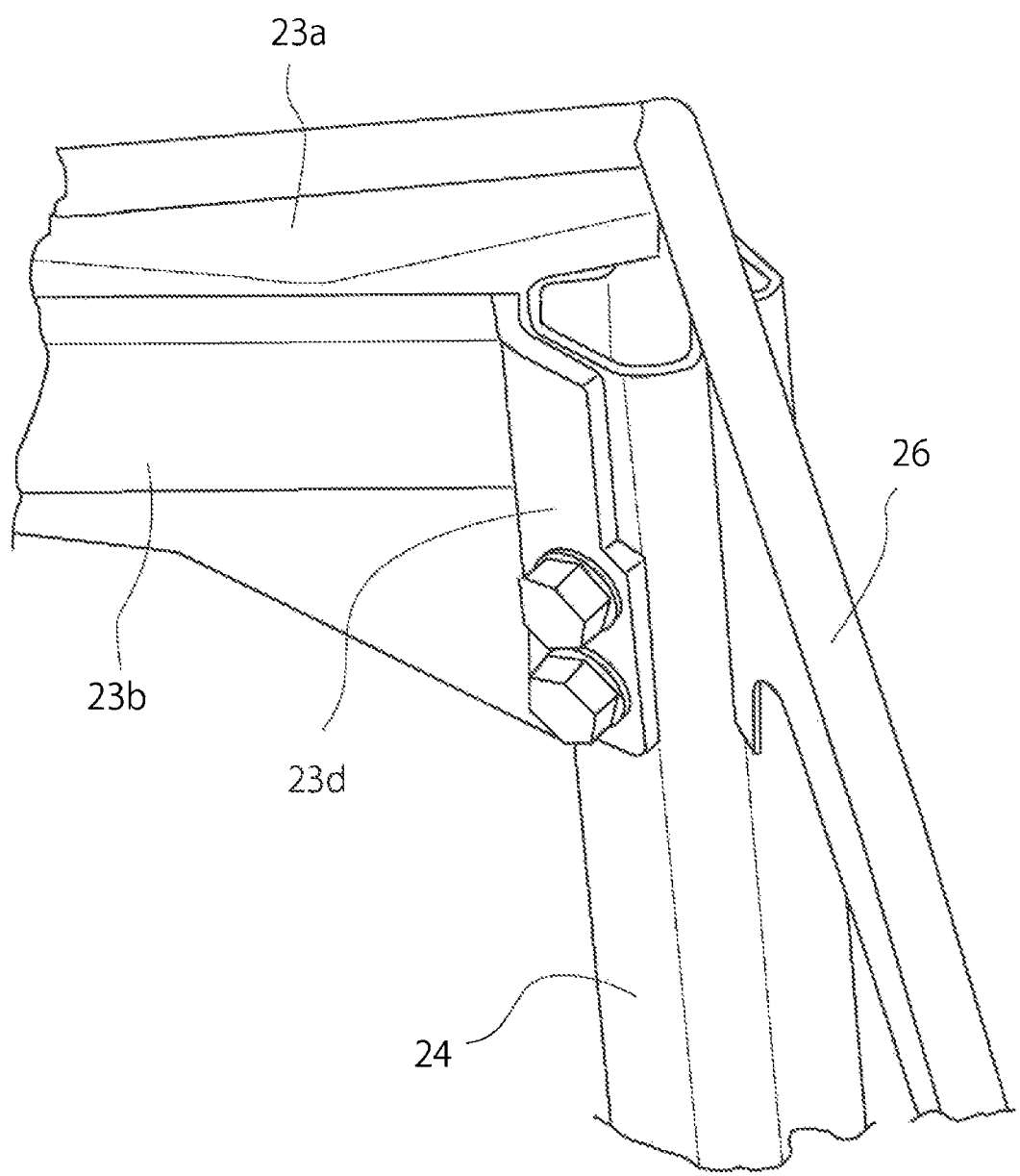
FIG. 10 is a perspective view showing an attachment portion among the upper portion of the front strut, a front portion of the roof frame, and an upper frame.

Upper portions of the front struts 24 are respectively fixed to front portions of roof flames 23 and left and right ends of the upper frame 26. Lower ends of the front struts 24 are respectively fixed to the attachment brackets 30 via the strut brackets 25. As shown in FIGS. 9 and 10, the front strut 24 is formed of a pipe having an approximately gourd shape in cross-sectional view. The upper portion of the front strut 24 is fixed by bolts, with the front coupling stay 23d disposed on the front portion of the roof frame 23 to be described later in contact with the upper inner diagonal surface of the front strut 24. One end of the upper frame 26 is welded to be fixed on the inner surface of the front strut 24. The upper frame 26 is formed by bending a plate body into an arc shape bulging toward the front. The left and the right ends of the upper frame 26 are brought into contact along recess portions of side surfaces of the front struts 24, to be welded to be fixed thereon. Thus, the upper frame 26 and the left and the right front struts 24 and 24 form the gate shape in front view.

Figure 6:
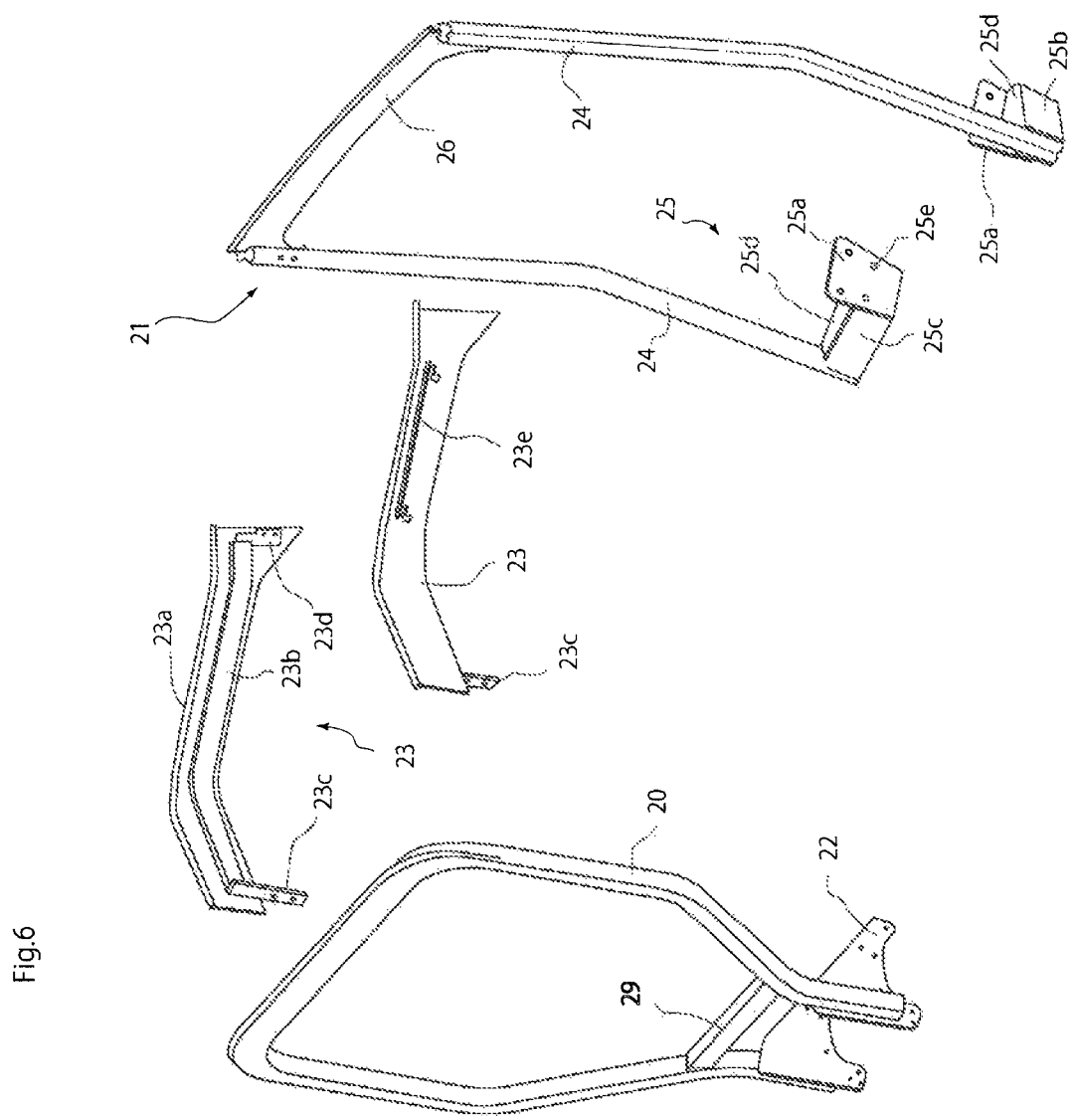
FIG. 6 is an exploded perspective view of the safety frame, the front strut, and a roof frame.

As shown in FIGS. 6 and 9, the strut bracket 25 includes a fixing plate 25a, side plates 25b and 25c, and an upper plate 25d. The side plates 25b and 25c protrude sideways on the front and the rear sides of the fixing plate 25a. Upper surfaces of the side plates 25b and 25c are covered by the upper plate 25d. A lower portion of the front strut 24 is welded and fixed on the outer ends of the side plates 25b and 25c and the upper plates 25d. The fixing plate 25a is provided with screw holes 25e, 25e, . . . , through which bolts are screwed in and fastened so that the fixing plate 25a is fixed. A lower side of the strut bracket 25 is opened. Thus, the bolt is able to be easily screwed into one of the screw holes 25e on the lower side of the fixing plate 25 and fastened.

The roof frame 23 couples and fixes the upper portion of the safety frame 20 with the upper portion of the front strut 24, and makes a roof 40 attachable. As shown in FIG. 6, the roof frame 23 includes a main plate 23a, a reinforcement frame 23b, a rear coupling stay 23c, a front coupling stay 23d, and a roof attachment body 23e. The main plate 23a extends in the front and rear direction and is formed of a plate having an approximately dogleg shape in side view. The reinforcement frame 23b is formed by bending a square pipe to have the shape corresponding to that of the main plate 23a, and is fixed on the inner surface of the main plate 23a. The rear coupling stay 23c is fixed on the rear inner surfaces of the main plate 23a and the reinforcement frame 23b. The front coupling stay 23d is fixed on the front inner surfaces of the main plate 23a and the reinforcement frame 23b. The roof attachment body 23e is disposed on a center portion of the outer surface of the main plate 23a in the front and rear direction.

The rear coupling stay 23c and the front coupling stay 23d are fixed on a plate surface of the main plate 23a while being perpendicular with respect to the main plate 23a. The rear coupling stay 23c and the front coupling stay 23d are provided with screw holes to be fixed by bolts. Thus, the rear coupling stay 23c is fixed on the corresponding one of the left and right side surfaces of the upper portion of the safety frame 20 by bolts (FIG. 8). The front coupling stay 23d is fixed on the corresponding one of the left and right side surfaces of the inner diagonal surface of the upper portion of the front strut 24 by bolts (FIG. 10).

Figure 2:
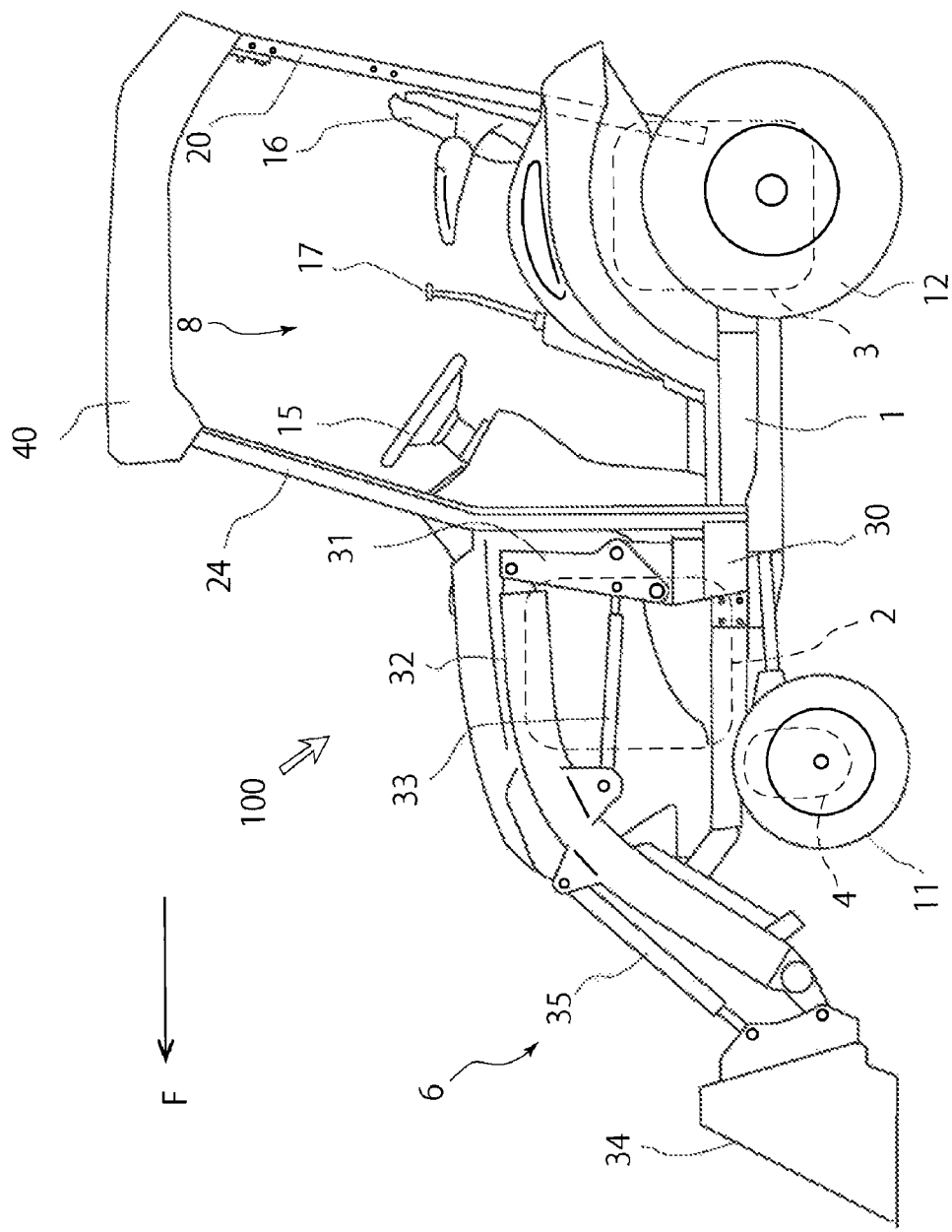
FIG. 2 is a side view of a tractor in which a roof is attached to a four-strut type safety frame.

As described above, when the vehicle type is changed from that of the tractor 100 including the safety frame 20 shown in FIG. 1 to that of the tractor including the roof 40 shown in FIG. 2, the left and right front struts 24 and 24 forming the gate shape together with the upper frame 26 are respectively fixed on the strut brackets 25 and 25. The roof frames 23 and 23 are laid across and coupled between the upper portions of the left and right front struts 24 and 24 and the both sides of the upper portion of the safety frame 20. The roof 40 is fixed on the roof attachment body 23e disposed on each of the roof frames 23 and 23. Thus, the configuration where the roof 40 is attached on the four-strut type safety frame is able to be achieved.

Figure 3:
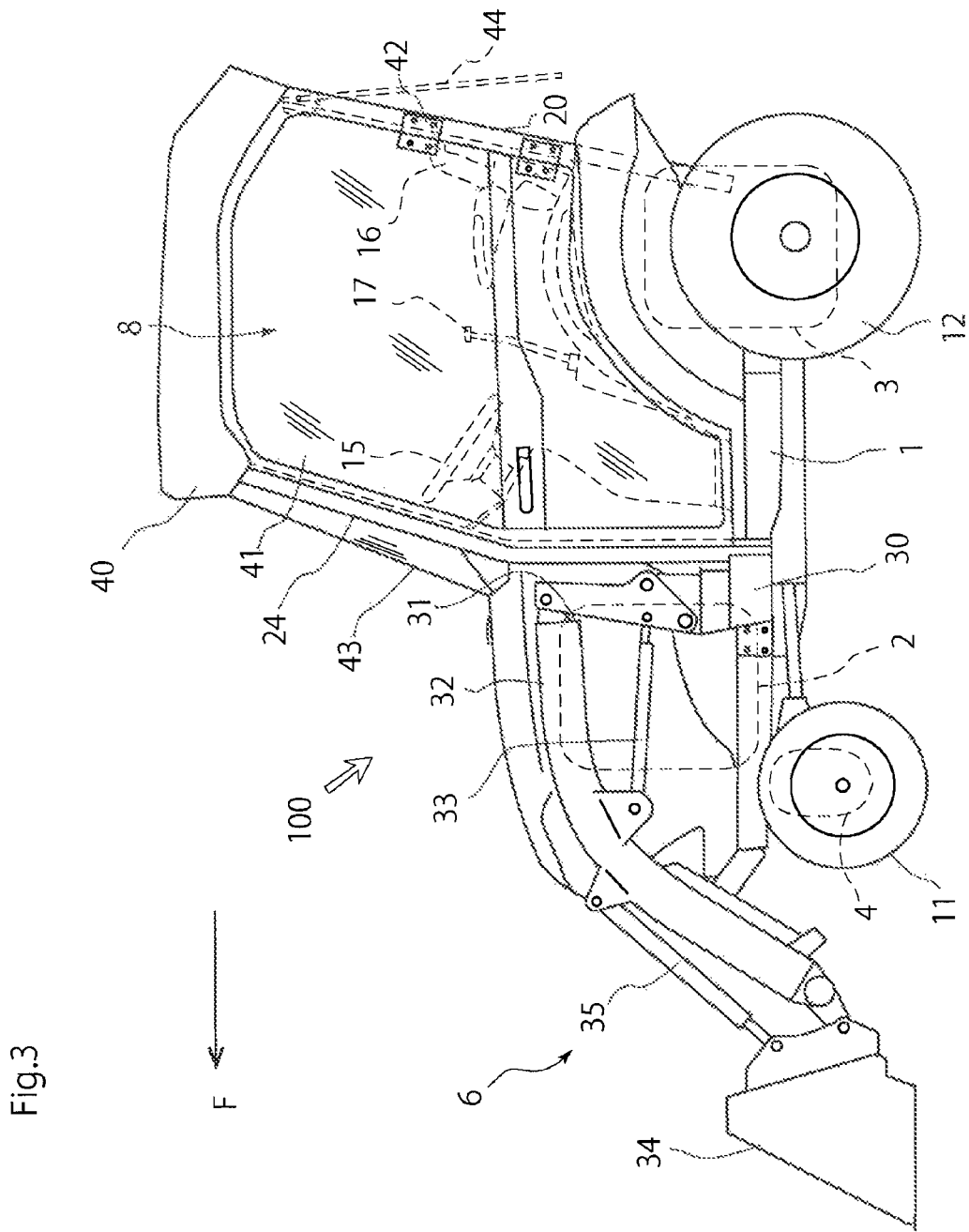
FIG. 3 is a side view of a tractor turned into to a cabin type by attaching a door.

The vehicle type is able to be changed from that of the tractor including the roof 40 shown in FIG. 2 to the cabin type shown in FIG. 3. The safety frame 20 is formed by bending a square pipe having an approximately rectangular cross sectional shape, and thus has a flat rear surface. Thus, a periphery of a rear window 44 (excluding a lower portion) is able to come into surface contact with the safety frame 20. Therefore, a closed space with no gap is able to be formed. The rear window 44 has an upper portion supported by a hinge to have a lower end rotatable toward the front and back. Thus, the rear window 44 is able to be opened backward.

The side surface of the safety frame 20 is also a flat surface. The side surface of the safety frame 20 is provided with the hinge attachment portion 20b. The hinge attachment portion 20b is provided with screw holes, to which the hinges 42 are attached. The rear portion of the door 41 is fixed on the hinges 42. Thus, a surface contact is achieved when the door 41 is closed. The front strut 24 has an approximately gourd shape in cross sectional view. Grooves are formed on the rear and inner surfaces of the front strut 24. Thus, the periphery of the door 41 and the front window 43 are able to come into surface contact with the groove. The front window 43 has a convex surface bulging toward the front.

As described above, the tractor 100 includes the two-strut type safety frame 20 standing from right and left side portions rearward from the seat 16. The attachment brackets 30 are fixed on both left and right outer surfaces of the vehicle body frame 1. The lower portions of the front frame 21 having a gate shape in front view are able to be respectively attached to and detached from the left and the right attachment brackets 30. The roof frames 23 and 23 coupling between the left and right upper portions of front frame 21 and the left and right upper portions of the safety frame 20 are attachable and detachable. Thus, the two-strut type safety frame 20 is able to be easily turned into the four-strut type safety frame by attaching the front frame 21 and the roof frames 23. Thus, the tractor 100 is able to be easily turned into the cabin type. The two-strut type safety frame is able to be used as it is, and thus, the number of parts is able to be reduced, and cost increase for changing to the cabin type is able to be held down.

The roof attachment bodies 23e are disposed on outer sides of the roof frames 23. The roof 40 is attached to the roof attachment bodies 23e. Thus, the roof is able to be easily attached and detached. The sunlight and rain are able to be easily blocked by the roof.

The hinge attachment portions 20b are disposed on the left and right outer surfaces of the upper portion of the safety frame 20. The door 41 is attached to the hinge attachment portions 20b via the hinges 42. The door 41 covers the side surface defined by the safety frame 20, the front frame 21, and the roof frame 23. Thus, the door 41 is able to be easily attached, and the side surface of the four-strut type safety frame is able to be easily covered.

What is claimed is:
1. A tractor comprising:
a seat;
a transmission casing;
a safety frame formed in a U-shape such that an upper portion of the safety frame extends between the upper ends of a right safety frame strut and a left safety frame strut;
a vehicle body frame;
right and left attachment brackets fixed on both right and left outer surfaces of the vehicle body frame;
a front frame having spaced-apart left and right front frame struts extending in a longitudinal direction, the left front frame strut and the right front frame strut having an upper end and a lower end;
a front frame upper member having a left end and a right end;
a right roof frame and a left roof frame, the right roof frame and the left roof, frame each having a front stay and a rear stay, the right roof frame and the left roof frame each having a distal side; and
a first roof attachment member and a second roof attachment member, wherein the seat and the transmission casing, are coupled to the vehicle body frame, wherein the lower ends of the right and left safety frame struts are coupled onto the right and left sides of the transmission casing;

wherein the front frame upper member extends between the upper ends of the left and right front frame struts, wherein the lower ends of the left and right front frame struts are configured to be detachably attached to the right and left attachment brackets, wherein the front stays on the right and left roof frames are configured to be detachably attached to the right and left ends of the front frame upper member, and wherein the rear stays of the right and left roof frames are configured to be detachably attached to the upper ends of the safety frame to connect the upper portion of the safety frame to the front frame upper member, and wherein a first roof attachment member is coupled to the distal side of the right roof frame and a second roof attachment member is coupled to the distal side of the left roof frame.

2. The tractor according to claim 1, further comprising:
a roof attached to the roof attachment members above the front frame upper member, the upper portion of the safety frame, and the right and left roof frames.

3. The tractor according to claim 1, further comprising:
a hinge attachment portion provided on a distal surface of the right or left safety frame strut upper portion of the safety frame; and
a door attached to the hinge attachment portion via a hinge so as to cover a side surface defined by the safety frame, the front frame and one of the right and left roof frames.

4. The tractor according to claim 1, wherein the right and left lower portions of the front frame are detachably attached to the right and left attachment brackets with bolts.

* * * * *